United States Patent [19]

Katz

[11] Patent Number: 4,472,442
[45] Date of Patent: Sep. 18, 1984

[54] DECAFFEINATION PROCESS
[75] Inventor: Saul N. Katz, Monsey, N.Y.
[73] Assignee: General Foods Corporation, White Plains, N.Y.
[21] Appl. No.: 191,105
[22] Filed: Sep. 26, 1980
[51] Int. Cl.$^3$ .............................................. A23F 5/20
[52] U.S. Cl. ................................... 426/428; 426/427; 544/275
[58] Field of Search ................. 426/427, 428; 544/275
[56] References Cited
U.S. PATENT DOCUMENTS
4,255,458  3/1981  Roselius et al. ..................... 426/427
FOREIGN PATENT DOCUMENTS
2737793  3/1979  Fed. Rep. of Germany ...... 426/427

OTHER PUBLICATIONS
Martin et al., Dimethyl Sulphoxide, Van Nostrand Reinhold Co.: Berkshire, England, pp. V–VII, 49–51, 105–107, 128–131, 269–271.

Primary Examiner—Joseph M. Golian
Attorney, Agent, or Firm—Thomas A. Marcoux; Thomas R. Savoie; Daniel J. Donovan

[57] ABSTRACT

The process described herein improves the decaffeination of both wet and dry green coffee beans with a liquid or supercritical carbon dioxide extractant by dissolving dimethyl sulfoxide in the extractant prior to contact with the beans. Rates of extraction are greatly improved, especially in the preferred mode where the dimethyl sulfoxide is employed at near saturation levels.

12 Claims, No Drawings

DECAFFEINATION PROCESS

The present invention relates to decaffeination, and more particularly to an improved process for decaffeinating green coffee beans with carbon dioxide in either the liquid or the supercritical state.

The prior art has long sought a process to effectively and non-destructively remove caffeine from coffee beans. Recently, a method for decaffeinating green coffee beans with moist supercritical carbon dioxide has been developed to achieve near quantitative extraction of caffeine while providing a high quality final product. Similarly, a good quality decaffeinated coffee can be produced by extraction with liquid carbon dioxide. Unfortunately, these procedures are quite costly and the rates of extraction are commercially impractical when using dry green beans. And, while moistening the beans prior to extraction improves processing efficiency, the process remains very costly. Therefore, it would be desirable to improve the rates of extraction with carbon dioxide to lower processing costs while still obtaining the advantages of using liquid or supercritical carbon dioxide to extract caffeine from green coffee.

BACKGROUND ART

Current commercial decaffeination of coffee is effected by the removal of caffeine from whole, green coffee beans. The beans are first moistened and then extracted with a solvent which is relatively specific for caffeine. The solvents employed commercially are either a chlorinated hydrocarbon solvent, such as discussed in U.S. Pat. No. 3,671,263 to Patel et al. or a caffeine-deficient water solution of green coffee solubles, such as disclosed in U.S. Pat. No. 2,309,092 to Berry et al.

In the decaffeination process of U.S. Pat. No. 2,309,092 which is commonly referred to as the water extraction system, a caffeine-laden water extract, resulting from contact between caffeine-containing green coffee and the caffeine-deficient water solution, is directly extracted with a solvent in order to remove caffeine. Typically, these solvents are the same chlorinated hydrocarbons which are employed in the direct solvent extraction processes, exemplified by the aforementioned U.S. Pat. No. 3,671,263.

Recently, the coffee industry has developed a number of procedures for decaffeinating green coffee without the use of chlorinated hydrocarbons; however, most of these are more expensive than desired based on current competitive conditions. Among the more promising of these procedures are those which involve contacting the green coffee beans with carbon dioxide in either the liquid or the supercritical state. For example, in U.S. Pat. No. 3,879,569 to Vitzthum et al., there is disclosed a process wherein liquid carbon dioxide is contacted with green coffee beans to extract the caffeine with good selectivity. In another recent patent, U.S. Pat. No. 3,806,619 to Zosel, there is disclosed a decaffeination method wherein near quantitative extraction of caffeine from green coffee beans is achieved through the use of supercritical carbon dioxide. According to this patent, green coffee beans are contacted with carbon dioxide in the supercritical state to extract caffeine. To further improve processing efficiency, with both liquid and supercritical carbon dioxide, the green beans are pre-moistened and the carbon dioxide is saturated with water.

It would be desirable to further improve the decaffeination of both dry and pre-moistened green coffee beans with both liquid and supercritical carbon dioxide.

DISCLOSURE OF INVENTION

The present invention now enables decaffeination of green coffee beans, whether wet or dry, by an improved process of the type comprising contacting the beans with a caffeine extractant comprising liquid or supercritical carbon dioxide, maintaining the contact for a period of time sufficient to extract at least a portion of the caffeine present in the green coffee beans, and separating the caffeine extractant from the green beans, wherein the improvement comprises dissolving dimethyl sulfoxide in the carbon dioxide.

The present invention takes advantage of the discovery that dimethyl sulfoxide, an aprotic solvent with strong caffeine extraction properties from either wet or dry coffee beans, can improve the rate of extraction of carbon dioxide in either the liquid or supercritical state while retaining good caffeine specificity and high quality end-products. The increases in efficiency achieved through the use of dimethyl sulfoxide to facilitate the extraction of caffeine with carbon dioxide is surprising both in the degree of the increase and the quality of the final product achieved.

The green coffee beans employed according to the present invention can be any of the principal commercial varieties. It is an advantage of the present invention, however, that the milder and more highly aromatic coffees such as Colombian coffee can be decaffeinated effectively. Green coffee beans can have any desired moisture content, but higher rates of extraction can be achieved with higher moisture contents. It is surprising, however, that green coffee beans with moisture contents of less than about 20% based on the total weight of the beans, and even as low as from about 4% to about 9%, the usual moisture content during shipping and storage, can be employed with a relatively high degree of selectivity and degree of extraction. The moisture content of the beans will be determined based upon the desired balance between the added cost of moistening and then drying the green beans versus the improvement in extraction rates which can be achieved through the moistening procedures.

The extractant will comprise carbon dioxide in either the supercritical or the liquid state and will also contain dimethyl sulfoxide to facilitate the removal of the caffeine from the green coffee beans. While the extractant can consist essentially of these two materials, there are circumstances under which other materials such as water, dissolved coffee solubles, and other additives may be desired. By the term "supercritical", it is meant that the carbon dioxide is above its critical temperature and pressure. By the term "liquid", it is meant that carbon dioxide is maintained at a temperature below its critical temperature of about 31° C. but is at a pressure sufficient to cause a phase change from the gaseous state to the liquid state with the evolution of the latent heat associated with the phase change.

The improvement according to the present invention is obtained whether the carbon dioxide is in the liquid state or in the supercritical state. Thus, to this extent, the specific temperatures and pressures employed according to the present invention do not affect the operability of the invention. It may be desirable under certain circumstances, to increase the temperature to a level in excess of the critical temperature where the added costs of doing this are justified by the increases in extractive efficiency. There are other cases, however, where it will be desired to maintain the carbon dioxide at a temperature below the critical value but maintain the pressure at levels high enough to maintain it in the liquid state.

Within these broad ranges, it is found that temperatures lower than about $-10°$ C. or above about $150°$ C. either provide very slow rates of extraction or adversely affect the flavor of the final decaffeinated coffee product. Preferably, the temperature of the extractant will be maintained between about $10°$ C. and about $100°$ C.

Broadly, the pressure should be within the range of about 20 to about 400 bar. As with the temperature, it is to be understood that the working pressure of the process depends upon the desired processing, the desired degree of extraction, the configuration of the specific process, and the other variables of the procedure; and a specific value within this range will be chosen for practical reasons.

The dimethyl sulfoxide is dissolved in the carbon dioxide to form what is believed to be a true solution under the conditions of extraction. Even minor amounts of dimethyl sulfoxide are effective to facilitate the removal of caffiene from green beans due to its high solvating capacity. This is true regardless of whether the beans are in their dry commercial state or have been pre-moistened for processing. Typically, the dimethyl sulfoxide will be employed in an amount of at least 10% of the weight required for complete saturation under conditions of extractive contact. Preferably, however, greater amounts of the dimethyl sulfoxide will be employed, with levels of above 50% of the weight required for complete saturation being preferred. Especially preferred are extractant compositions wherein the dimethyl sulfoxide is employed at near its saturation level.

As disclosed in my copending U.S. patent application, Ser. No. 191,200, filed on the same date as this application and entitled "Aprotic Solvent Decaffeination", it is believed that a complex exists in the green coffee beans between potassium chlorogenate and caffeine. It is further believed, without any desire to be bound to a particular theory of operation, that the dimethyl sulfoxide is capable of efficiently breaking up this complex. Dimethyl sulfoxide is a colorless, hygroscopic liquid having a boiling point of about $189°$ C. It is known to be an extremely powerful aprotic solvent which readily penetrates animal skin and other tissues. Regardless of the theory of operation, it is apparent that the dimethyl sulfoxide rapidly penetrates the cellular structure of the green coffee beans to facilitate the removal of the caffeine by the extractant which comprises carbon dioxide.

Where the green coffee beans are pre-moistened to enhance the rate of extraction by the supercritical or liquid carbon dioxide, the extractant will also preferably contain water. Preferably, the extractant will contain water in an amount sufficient to saturate the extractant under the conditions of contact with the green coffee beans. The water content of the extractant will typically be selected to maintain a pre-determined minimum water content for the green coffee beans to be maintained throughout the processing. Where the moisture content is too low, the degree of extraction will be reduced. Where the moisture content is too high, the cost of removing the additional water will become excessive. A preferred minimum water content is above 15% by weight.

The extractant should be contacted with the green coffee beans in sufficient quantities and under other conditions effective to provide an acceptable rate and degree of extraction. Preferably, the concentration of the caffeine within the extractant should be maintained at a level of below about 0.010, and preferably below about 0.002 grams per kilogram of extractant to obtain an effective rate of decaffeination. The exact concentration will, however, depend ultimately upon economics and a number of other variables in the process. An advantage of the present invention is that a high selectivity characteristic of carbon dioxide for caffeine is retained while the very high solvating power of the dimethyl sulfoxide improves the rate of extraction. Even with the high degree of selectivity for the extractant solution of the present invention, certain coffee components such as sugars are dissolved to varying degrees by the extractant. It is preferred to maintain the concentration of these soluble materials at relatively high levels, preferably near their points of saturation, within the extractant solution.

The degree of saturation of the extractant solution with the caffeine can be maintained at an effectively low level in a batch operation by using a sufficiently large quantity of the extractant so that, at the desired degree of decaffeination, the extractant solution will be capable of dissolving all of the extracted caffeine. Alternatively, and preferably, a solid adsorbent is added to the solvent to act as a caffeine sink, drawing the caffeine from the solution and thereby maintaining an effective driving force for the extraction of the caffeine from the green coffee beans.

Where the solid adsorbent is employed, it is preferably highly selective with regard to caffeine as opposed to the other components within the extractant solution which, after contact with green coffee beans comprises the various components of the solvent and also caffeine and other dissolved coffee solids. This can be achieved by selecting a solid adsorbent material which is initially highly selective toward caffeine or by making it so by loading it to its point of saturation with other coffee solubles. When desired, the selectivity of the solid adsorbent can be improved by coating it with a suitable caffeine-selective coating, such as described in my commonly assigned, co-pending patent application Ser. No. 159,725, filed on June 16, 1980, and entitled "Adsorption Decaffeination".

The adsorbent must be able to adsorb caffeine and be physically stable under the conditions of processing. Among the known caffeine adsorbents are clays, such as discussed in U.S. Pat. No. 2,391,981 and U.S. Pat. No. 2,416,484 to Kremers; zeolites and ion exchange resins as taught in U.S. Pat. No. 3,108,876 to Turken et al.; hydrated silicates as taught in U.S. Pat. No. 2,375,550 to Grossman; polymeric non-ionogenic adsorption resins, especially styrene divinylbenzene macroreticular resins of the type disclosed by Gustafson in U.S. Pat. No. 3,531,463; and activated carbon, especially finely-divided activated carbon derived from coconut or coal. While any of these or the other usual solid adsorbents known to the art for uses such as this can be employed, the solid adsorbent will preferably comprise a member selected from the group consisting of activated carbon, clay, hydrated silicates, zeolites, ion exchange resins, non-ionogenic adsorption resins, and any combination of these. Among these, activated carbon is preferred because of its desirable balance between cost and effectiveness.

The solid adsorbent can be employed in sufficient quantities to maintain an effectively low concentration of caffeine within the extractant solution during the period of contact between the green beans and the extractant. The exact amount of solid adsorbent employed will depend both upon the capacities of the extractant material and the solid adsorbent at the particular conditions of contact. Also, it may be desired to provide a major excess of the adsorbent to obtain the highest possible driving force for the decaffeination.

The process can be conducted either batch-wise or continuously. Batch operation has the advantage of simplicity in that all that must be done to achieve the desired results is to admix the materials. Continuous operation is, however, preferred because it decreases the overall size of the equipment required and the processing time. Moreover, by constantly withdrawing and renewing either the extractant liquid or solid adsorbent by removal of caffeine, the quantity of the extractant and the solid adsorbent can be minimized. The greatest driving force for the extraction can be achieved where the flow of beans is countercurrent to the flow of extractant. This can be done either in a totally continuous or a stage-wise procedure in equipment of the type known to the art. Another advantage of continuous or semi-continuous operation is that the solvent can be contacted with the beans in a continuously flowing stream and then passed to a separate bed of solid adsorbent where the solvent is renewed by removal of the caffeine. Operation in a configuration such as this will eliminate any need for contact between the green coffee beans and solid adsorbent.

Another procedure for separating and continuously renewing the extractant liquid is to withdraw them from contact with the beans and reduce the pressure on the extractant solution to achieve a two-phase mixture wherein the liquid dimethyl sulfoxide is rich in caffeine. The gaseous carbon dioxide is recompressed and recycled to the process. The dimethyl sulfoxide is also recycled after the caffeine is removed. This can be done by evaporation or by contacting it with a solid adsorbent. As indicated previously, the temperature affects both the degree of extraction and the quality of the final product. The temperature will affect the rate of extraction, the selectivity of the extractant solution and the solid adsorbents, and the relative capacity of the extractant solution and the solid adsorbent for holding the extracted caffeine. Accordingly, it is not possible to identify a single temperature or range of temperatures as universally defining optimum conditions. It is believed, however, that the temperatures mentioned previously should provide good results under most processing schemes. The selection of a temperature will depend upon materials and processing equipment and conditions employed, and may be within or outside of this range.

Total contact time, or residence time within an extractor will depend upon the factors discussed above as well as the desired degree of caffeine extraction. While economics is a controlling factor, it must be borne in mind that excessively long contact times adversely affect coffee flavors. Those skilled in the art will be able to balance these factors as necessary, given the exemplary situation set forth in the following example.

The green beans decaffeinated according to the procedure of the present invention can be roasted in conventional fashion to obtain a high quality decaffeinated coffee and can be blended in the normal fashion. It is an advantage of the present invention that, because it is not necessary to pre-wet the beans prior to decaffeination, it is not necessary to dry the beans prior to roasting or extend the roast time to accommodate the excess moisture content. This can improve the overall efficiency of operation and can decrease the amount of energy required for roasting the beans. The elimination of the need to drive off the excess moisture will also tend to improve the quality of the final product. It is equally as much an advantage of the present invention, however, that very high extraction rates can be obtained with pre-wetted beans while still maintaining very high quality for the final product.

BEST MODE FOR CARRYING OUT THE INVENTION

The following Example is provided to illustrate and explain what is presently considered the best mode for carrying out the invention. The data is for illustrative purposes to guide the person of ordinary skill in the art and is not to be taken as limiting in any regard. Unless otherwise indicated, all parts and percentages are by weight.

EXAMPLE

Four samples of green coffee beans were decaffeinated by contacting them for up to 8 hours in a pressurized apparatus containing 10 grams of green coffee beans with an extractant solution maintained at a pressure of 250 bar and a temperature of 80° C. The extractant solution was continuously fed through the apparatus at a rate of 8,000 grams of extractant solution per gram of green coffee beans per hour. The four samples included both "moist" and "dry" controls which were processed in the same manner as "moist" and "dry" beans processed according to the present invention wherein dimethyl sulfoxide (DMSO) was dissolved in the extractant at a level near its point of saturation. The following table details the test conditions and results.

| Sample | Bean Moisture Content (%) | Extractant Solution | Estimated Time (Hours) for 97.4% Caffeine Removal |
|---|---|---|---|
| Dry-Control | 7.33 | Dry $CO_2$ | 85 |
| Dry-Invention | 7.33 | Dry $CO_2$ + DMSO | 55 |
| Moist-Control | 50 | $CO_2$ saturated with $H_2O$ | 4.5 |
| Moist-Invention | 50 | $CO_2$ saturated with $H_2O$ + DMSO | 3.0 |

The figures in the last column show that the times estimated as necessary to achieve 97.4% decaffeination, the figure widely commercially used at present, are greatly improved by employing dimethyl sulfoxide within the extractant solution. These times were estimated from the raw data by the standard method of extrapolating on semi-log paper to the required degree of decaffeination.

The above description is for the purpose of describing the invention to people having ordinary skill in the art to enable them to practice it. It is not meant to detail all of the obvious modifications and variations of the invention which will become apparent upon reading. It is intended, however, that all such modifications and variations be included within the scope of the invention which is defined by the following claims.

I claim:

1. An improved method for decaffeinating green coffee beans by a process comprising contacting the beans with a caffeine extractant comprising liquid or supercritical carbon dioxide, maintaining the contact for a period of time sufficient to extract at least a portion of the caffeine present in the green coffee beans, and separating the caffeine extractant from the green beans, wherein the improvement comprises dissolving dimethyl sulfoxide in the carbon dioxide.

2. A method according to claim 1 wherein the caffeine extractant comprises liquid carbon dioxide.

3. A method according to claim 1 wherein the caffeine extractant comprises supercritical carbon dioxide.

4. A method according to claim 1 wherein the beans have a moisture content of less than about 20% by weight prior to contact with the extractant.

5. A method according to claim 4 wherein the beans have a moisture content of from about 4 to 9% by weight prior to contact with the extractant.

6. A method according to claim 1 which includes the further step of contacting the caffeine extractant with a solid adsorbent to remove at least a portion of the caffeine dissolved therein.

7. A method accoridng to claim 6 wherein the solid adsorbent comprises a member selected from the group consisting of activated carbon, clay, hydrated silicates, zeolites, ion exchange resins, non-ionogenic adsorption resins, and any combination of these.

8. A method according to claim 1 wherein the caffeine extractant is maintained saturated with respect to soluble coffee components other than caffeine.

9. A method according to claim 8 which includes the further step of contacting the caffeine extractant with a solid adsorbent to remove at least a portion of the caffeine dissolved therein.

10. A method according to claim 1 wherein the dimethyl sulfoxide is dissolved in the carbon dioxide in an amount of at least 10% of the weight required for complete saturation under the conditions of contact.

11. A method according to claim 10 wherein the dimethyl sulfoxide is dissolved in the carbon dioxide in an amount of at least 50% of the weight required for complete saturation under the conditions of contact.

12. A method according to claim 1 wherein the caffeine extractant contains water in an amount sufficient to saturate the extractant under the conditions of contact.

* * * * *